(12) United States Patent
Yan et al.

(10) Patent No.: US 12,356,391 B2
(45) Date of Patent: Jul. 8, 2025

(54) RESOURCE CONFIGURATION

(71) Applicant: LENOVO (BEIJING) LIMITED, Beijing (CN)

(72) Inventors: Zhi Yan, Beijing (CN); Lianhai Wu, Beijing (CN); Haipeng Lei, Beijing (CN); Hongmei Liu, Beijing (CN); Jie Shi, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 438 days.

(21) Appl. No.: 17/425,481

(22) PCT Filed: Jan. 25, 2019

(86) PCT No.: PCT/CN2019/073100
§ 371 (c)(1),
(2) Date: Jul. 23, 2021

(87) PCT Pub. No.: WO2020/150986
PCT Pub. Date: Jul. 30, 2020

(65) Prior Publication Data
US 2022/0104225 A1 Mar. 31, 2022

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC .......................... H04W 72/1268; H04W 72/23
See application file for complete search history.

(56) References Cited

U.S. PATENT DOCUMENTS

2014/0225762 A1* 8/2014 Seller ................... G01S 13/876
342/125
2018/0176945 A1 6/2018 Cao et al.
(Continued)

FOREIGN PATENT DOCUMENTS

CN 101871978 A * 10/2010
CN 107950065 A 4/2018
(Continued)

OTHER PUBLICATIONS

Internation Searching Authority, "Written Opinion of the International Searching Authority," PCT/CN2019/073100, Oct. 18, 2019, pp. 1-3.
(Continued)

*Primary Examiner* — Zhensheng Zhang
(74) *Attorney, Agent, or Firm* — Kunzler Bean & Adamson (57) ABSTRACT

Methods and apparatuses for resource configuration are disclosed. In one embodiment, a method at a remote unit comprises: receiving a preconfigured uplink resource (PUR) configuration; and transmitting uplink data in a frequency-time resource starting from a starting time, wherein the starting time is determined based on at least one of: (1) a connection release signaling reception time; (2) a first time offset for data processing; (3) an uplink data transmission time; (4) an uplink data retransmission timer; (5) a PUR configuration reception time; (6) a second time offset for scheduling flexibility; (7) a third time offset to a predetermined reference time; and (8) a length of time durations for PUR interval.

20 Claims, 6 Drawing Sheets

(56) References Cited

U.S. PATENT DOCUMENTS

2018/0288746 A1    10/2018  Zhang et al.
2019/0053037 A1*    2/2019  Shu ...................... H04W 60/04
2019/0158229 A1*    5/2019  Wei ...................... H04L 1/1848

FOREIGN PATENT DOCUMENTS

| CN | 108574983 A | 9/2018 |
|---|---|---|
| EP | 3104652 A1 | 12/2016 |
| WO | 2018232321 A2 | 12/2018 |

OTHER PUBLICATIONS

Huawei, Hisilicon, Uplink transmission in dedicated pre-configured resource, 3GPP TSG-RAN WG2 Meeting #104, R2-1816401, Nov. 12-16, 2018, pp. 1-5, Spokane, USA.

ZTE Corporation, Main issues for transmission over preconfigured dedicated resource in Idle, 3GPP TSG-RAN2 meeting #104, R2-1816993, Nov. 12-16, 2018, pp. 1-11, Spokane, United States.

Qualcomm Incorporated, Supporting UL data transmission on preconfigured resources in Idle, 3GPP TSG-RAN WG2 Meeting #104, R2-1817911, Nov. 12-Nov. 16, 2018, pp. 1-7, Spokane, USA.

* cited by examiner

RESOURCE CONFIGURATION

FIELD

The subject matter disclosed herein generally relates to wireless communications and, more particularly, to preconfigured uplink resource (PUR) configuration.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Preconfigured Uplink Resource (PUR), Machine Type Communication (MTC), MTC Physical Downlink Control Channel (MPDCCH), Semi-Persistent Scheduling (SPS), System Frame Number (SFN), enhanced Machine-Type Communication (eMTC), Narrow Band Internet of Things (NBIoT), Resource unit (RU), Downlink Control Information (DCI).

Figure 4:
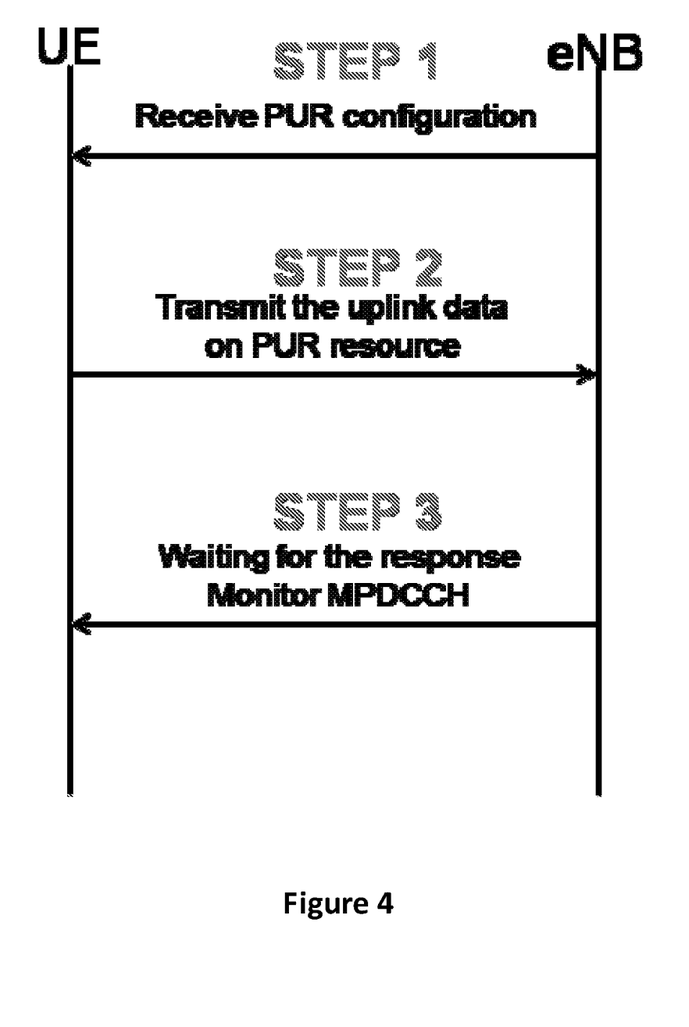
FIG. 4 illustrates a basic procedure of uplink transmission based on PUR.

A basic procedure of uplink transmission based on preconfigured uplink resource (PUR) is shown in FIG. 4.

In step 1, UE receives PUR configuration from eNB before transiting to IDLE mode. In step 2, based on the PUR configuration, UE transmits uplink data in IDLE mode. In step 3, UE monitors MPDCCH for a response on whether the uplink data transmission is successful or a retransmission grant is received.

The PUR configuration includes PUR frequency-time resource information. The PUR frequency-time resource information includes at least a starting time of PUR resources and an interval between the PUR resources.

Figure 5:
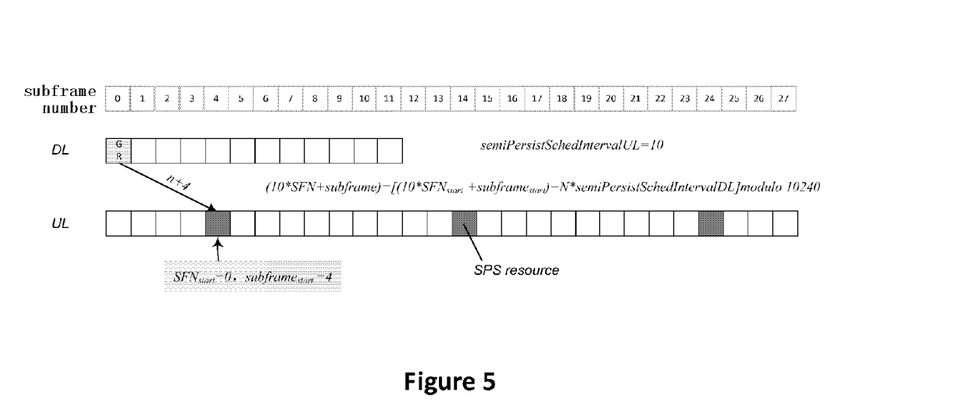
FIG. 5 illustrates a SPS resource configuration.

FIG. 5 illustrates a SPS (semi-persistent scheduling) resource configuration that may be used for SPS based uplink transmission. The starting time of the SPS resources is determined on DCI (Downlink Control Information) activation timing plus a predetermined time period (e.g., 4 subframes). FIG. 5 indicates that the DCI activation timing is SFN=0, subframe number=0, and that the predetermined time period is four subframes. Therefore, the starting time of the SPS resource is "$SFN_{start}=0$, $subframe_{start}=4$". In FIG. 5, the SPS resources interval, i.e. (semiPersistSchedIntervalUL) is 10 (i.e. 10 subframes). Therefore, the next SPS resource will be ($SFN_{start}=0$, $subframe_{start}=4$)+10 subframes=($SFN_1=1$, $subframe_1=4$) (or simple subframe number=14).

Please note that the starting time is represented by a simple subframe number, or by "a SFN and a subframe number". Here, we can say that the granularity of starting time is a subframe.

The simple subframe number of the $N^{th}$ SPS resource may be represented as (10*SFN+subframe)=[(10*$SFN_{start}$+sub-frame$_{start}$)+N*semiPersistSchedIntervalUL] modulo 10240. The modulo operation by 10240 means that the SPS resources will wrap around every 10240 subframes (i.e. 10.24 s). This is caused by the fact that the range of SFN is from 0 to 1023, as defined in 3GPP LTE.

If the SPS resource configuration method is used for PUR resource configuration, there would be some problems. The first problem is related to the starting time of the PUR resource. The starting time of the SPS resource is determined based on the DCI activation timing. However, the PUR may not be associated with DCI activation. In this condition, since there is no DCI activation timing, it is unclear how to define the starting time of the configured PUR resources. The second problem is that each SPS resource includes one subframe (i.e. 1 ms) in duration. This is not sufficient in eMTC and NBIoT, in which each RU may include 2 ms or 4 ms. The third problem is the maximum the SPS resources interval is short. For eMTC and NBIoT in IDLE mode, the configuration of PUR is based on traffic mode (every 100 ms, and sometimes every 10 hours). Therefore, longer maximum PUR resource interval should be considered.

In this disclosure, the invention proposes solutions to solve the above-identified problems.

BRIEF SUMMARY

Methods and apparatuses for resource configuration are disclosed.

In one embodiment, a method at a remote unit comprises: receiving a preconfigured uplink resource (PUR) configuration; and transmitting uplink data in a frequency-time resource starting from a starting time, wherein the starting time is determined based on at least one of: (1) a connection release signaling reception time; (2) a first time offset for data processing; (3) an uplink data transmission time; (4) an uplink data retransmission timer; (5) a PUR configuration reception time; (6) a second time offset for scheduling flexibility; (7) a third time offset to a predetermined reference time; and (8) a length of time durations for PUR interval.

In some embodiment, the frequency-time resource has a length of time durations for PUR duration, and the length of time durations for PUR duration is included in the PUR configuration. In addition, a valid time pattern indicating each of the time durations being valid or invalid is further included in the PUR configuration. Moreover, one time duration for PUR Duration is a subframe or a frame.

In some embodiment, the length of time durations for the PUR interval is included in the PUR configuration. One time duration for the PUR interval is a subframe or a frame. In some embodiment, the first time offset for data processing is included in the PUR configuration. Alternatively, the first time offset for data processing is a fixed positive value. In some embodiment, the second time offset is included in the PUR configuration.

In some embodiment, the starting time is expressed as a frame number and a subframe number, or as a hyper frame number, a system frame number and a subframe number, or as a hyper frame number and a system frame number. In particular, a length of a hyper frame is 10240 ms, a length of a frame is 10 ms, and a length of a subframe is 1 ms.

In some embodiment, the starting time is determined by the connection release signaling reception time plus at least the first time offset for data processing. Alternatively, the starting time is determined by the uplink data transmission time plus at least the uplink data retransmission timer.

Alternatively, the starting time is determined by the PUR configuration reception time plus at least a number of the lengths of time durations for the PUR intervals to ensure the remote unit to transit to IDLE mode. In all these three embodiments, the starting time may be determined by further plus the second time offset for scheduling flexibility. In some other embodiment, the predetermined reference time is a system initial time, and the starting time is determined by the third time offset to the system initial time plus at least a number of the lengths of time durations for the PUR intervals to ensure the remote unit to transit to IDLE mode.

In another embodiment, a remote unit comprises: a receiver that receives a preconfigured uplink resource (PUR) configuration; and a transmitter that transmits uplink data in a frequency-time resource starting from a starting time, wherein the starting time is determined based on at least one of: (1) a connection release signaling reception time; (2) a first time offset for data processing; (3) an uplink data transmission time; (4) an uplink data retransmission timer; (5) a PUR configuration reception time; (6) a second time offset for scheduling flexibility; (7) a third time offset to a predetermined reference time; and (8) a length of time durations for PUR interval.

In yet another embodiment, a method at a base unit comprises: transmitting a preconfigured uplink resource (PUR) configuration; and receiving uplink data in a frequency-time resource starting from a starting time, wherein the starting time is determined based on at least one of: (1) a connection release signaling reception time; (2) a first time offset for data processing; (3) an uplink data transmission time; (4) an uplink data retransmission timer; (5) a PUR configuration reception time; (6) a second time offset for scheduling flexibility; (7) a third time offset to a predetermined reference time; and (8) a length of time durations for PUR interval.

In further embodiment, a base unit comprises: a transmitter that transmits a preconfigured uplink resource (PUR) configuration; and a receiver that receives uplink data in a frequency-time resource starting from a starting time, wherein the starting time is determined based on at least one of: (1) a connection release signaling reception time; (2) a first time offset for data processing; (3) an uplink data transmission time; (4) an uplink data retransmission timer; (5) a PUR configuration reception time; (6) a second time offset for scheduling flexibility; (7) a third time offset to a predetermined reference time; and (8) a length of time durations for PUR interval.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
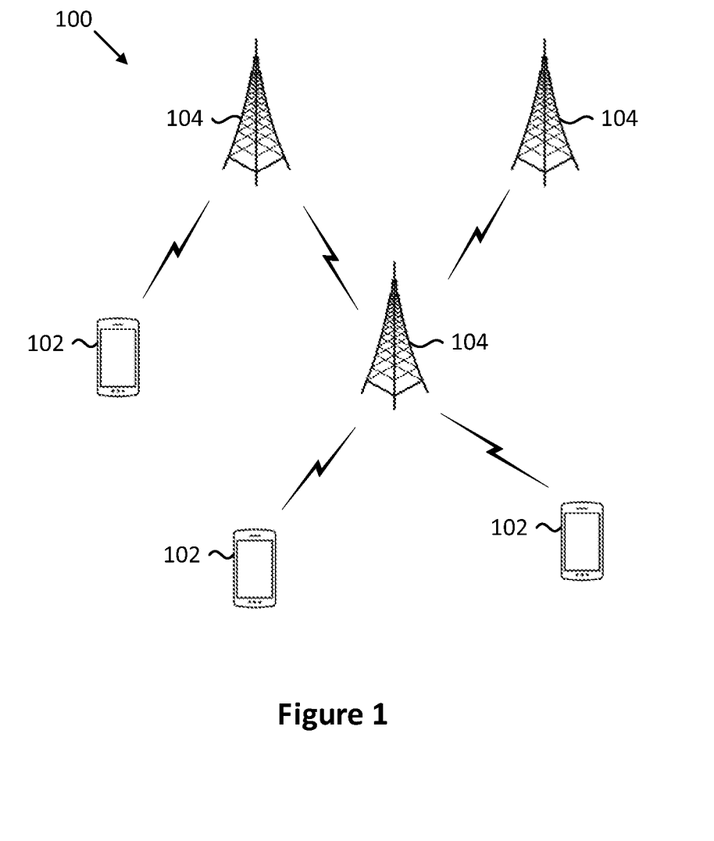
FIG. 1 is a schematic block diagram illustrating one embodiment of a wireless communication system.

FIG. 1 depicts an embodiment of a wireless communication system 100 for UE grouping. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art. The remote units 102 may be Narrow Band Internet of Things (NB-IoT) terminals.

The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

The control node 106 is a control plane network element that handles signaling related to mobility and security for the remote units 102. For example, the control node 106 may be a Mobility Management Entity (MME).

Figure 2:
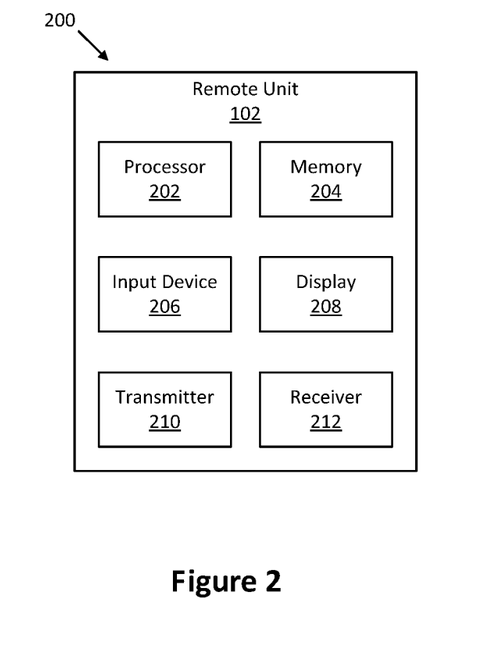
FIG. 2 is a schematic block diagram illustrating one embodiment of an apparatus that may be used for resource configuration.

FIG. 2 depicts one embodiment of an apparatus 200 that may be used for UE grouping. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
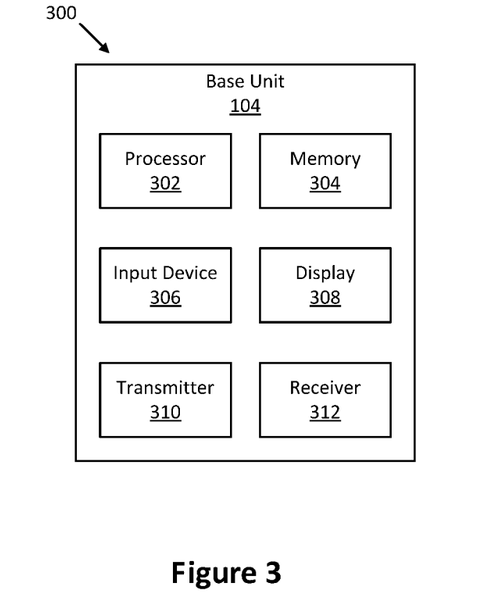
FIG. 3 is a schematic block diagram illustrating one embodiment of another apparatus that may be used for resource configuration.

FIG. 3 depicts one embodiment of another apparatus 300 that may be used for UE grouping. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 6:
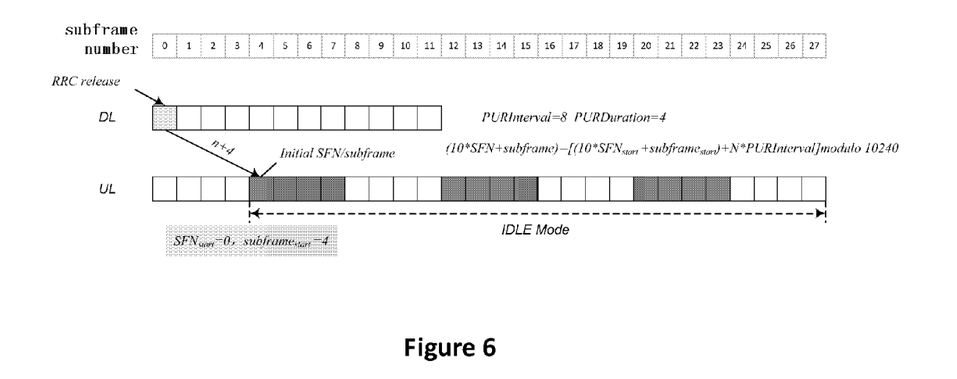
FIG. 6 illustrates a first embodiment for PUR resource configuration.

FIG. 6 illustrates a first embodiment for resource configuration. As described in the background part, the starting time of the SPS resource is determined based on DCI activation timing. However, there is no DCI activation for the uplink transmission based on PUR. In view of the above, a new timing reference is necessary for determining the starting time of the PUR resource.

In the first embodiment, the reception time of connection release signal (e.g., RRCConnectionRelease or RRCrelease) is used to determine the starting time of the PUR resource. PUR resources are reserved by eNB after RRCConnectionRelease or RRCrelease transmission.

In particular, the starting time of the PUR resource is the reception time of RRCConnectionRelease or RRCrelease plus at least a fixed time offset.

The fixed time offset is used for data processing by the UE. For example, the UE needs time to generate the uplink data to be transmitted in PUR resources. The fixed time offset may be predetermined as a positive value. For example, the fixed time offset may be set as 4 ms, i.e. 4 subframes. Alternatively, the fixed time offset may be configured in the PUR configuration. A fixed time offset value may be included in the PUR configuration.

The starting time of the PUR resource may be represented by a simple frame number. Since a frame is equal to ten subframes and SFN is the frame number defined in 3GPP LTE, the starting time of the PUR resource is preferably represented by a SFN and a subframe number. In FIG. 6, the reception time of RRCConnectionRelease or RRCrelease is SFN=0 and subframe number=0. Therefore, the starting time of the PUR resource is SFN=0 and subframe number=0 plus 4 subframes, i.e. SFN=0 and subframe number=4, which may be represented as "$SFN_{start}=0$, $subframe_{start}=4$".

The PUR resource can be configured as periodic PUR occasions. Each PUR occasion indicate a starting timeslot plus a timeslot duration.

The interval between adjacent PUR occasions may be referred to as a PUR period, or a PUR interval (PURInterval). In the PUR period (PURInterval), the transmission of uplink data may be referred to as a PUR duration (PURDuration). The granularity of PUR Duration is a subframe or a frame.

The PURInterval and the PURDuration may be configured in the PUR configuration. That is, a PURInterval value and a PURDuration value are included in the PUR configuration. The granularity of PUR Interval is a subframe or a frame.

In FIG. 6, the interval between adjacent PUR occasions (i.e. PURInterval) is 8 subframes. And, the duration of one PUR occasions (i.e. PURDuration) is 4 subframes.

The starting timeslot (i.e. starting subframe number) of the $N^{th}$ PUR occasion may be represented by: $(10*SFN+subframe)=[(10*SFN_{start}+subframe_{start})+N*PURInterval]$ modulo 10240, in which $SFN_{start}$ and $subframe_{start}$ are the starting SFN number and the starting subframe number for the PUR resource (namely, the $0^{th}$ PUR occasion); and PURInterval is the interval between adjacent PUR occasions. The modulo operation by 10240 means that PUR occasions will wrap around every 10240 subframes (i.e. 10.24 s). This is caused by the fact that the range of SFN is from 0 to 1023, as defined in 3GPP LTE. As described earlier, in the first embodiment, the starting SFN number and the starting subframe number for the PUR resource $(10*SFN_{start}+subframe_{start})$ is the reception time of RRCConnectionRelease or RRCrelease plus at least a fixed time offset.

As shown in FIG. 6, the $1^{st}$ PUR occasion occurs at $[(10*0+4)+1*8]=12$ (i.e. simple subframe number=12, or SFN=1 and subframe number=2). The $2^{nd}$ PUR occasion occurs at $[(10*0+4)+2*8]=20$ (i.e. simple subframe number=20, or SFN=2 and subframe number=0).

The first embodiment may be used in a situation in which the RRCConnectionRelease or RRCrelease signaling is explicitly transmitted from eNB. Nevertheless, even without reception of explicit RRCConnectionRelease or RRCrelease signaling, the UE may autonomously switches its state transition from connect to idle when data inactivity timer expires.

In view of the above, in a second embodiment, the uplink transmission timing and an uplink data retransmission timer (e.g., ULRetransmissionTimer) are used to determine the starting time of the PUR resource.

Starting from the timing of the last uplink transmission, if the ULRetransmissionTimer expires, the UE will transit to IDLE mode. Therefore, the starting time of the PUR resource is the last uplink transmission timing plus at least ULRetransmissionTimer, and optionally plus a fixed time offset.

The fixed time offset is the same as in the first embodiment, i.e. used for the data processing by UE. Since it is likely that the ULRetransmissionTimer is enough for the data processing by the UE, the fixed time offset may NOT be added for determining the starting time of the PUR resource in the second embodiment.

For the second embodiment, the simple subframe number of the $N^{th}$ PUR occasion may also be represented as $(10*SFN+subframe)=[(10*SFN_{start}+subframe_{start})+N*PURInterval]$ modulo 10240, i.e. the same as the first embodiment.

In the second embodiment, the PURDuration and the PURInterval may also be configured in the PUR configuration.

Figure 7:
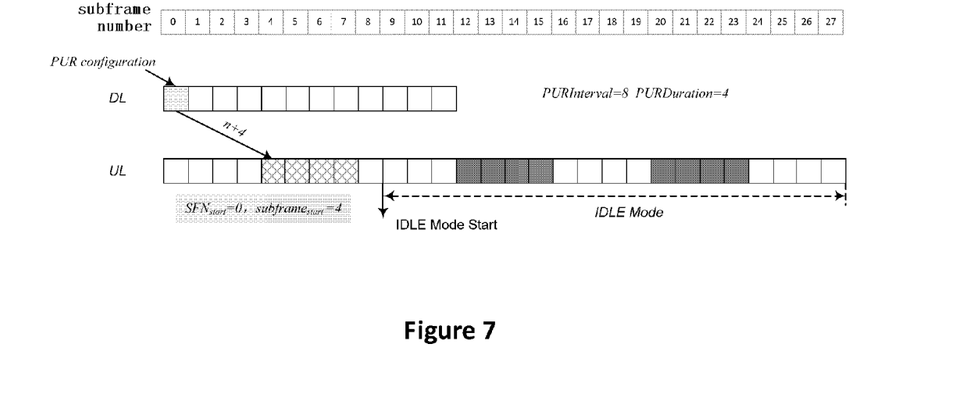
FIG. 7 illustrates a third embodiment for PUR resource configuration.

FIG. 7 shows a third embodiment for PUR resource configuration. In the third embodiment, the reception time of the PUR configuration is used to determine the starting time of the PUR resource.

In particular, the starting time of the PUR resource is the reception time of the PUR configuration plus at least one or more PURIntervals, and optionally plus a fixed time offset The fixed time offset is the same as in the first embodiment, i.e. used for the data processing by UE. Since it is likely that one or more PURIntervals are enough for the data processing by the UE, the fixed time offset may NOT be added for determining the starting time of the PUR resource in the third embodiment.

As shown in FIG. 7, at the time of the reception time of the PUR configuration plus the fixed time offset, the UE has not transited into the IDLE mode. Therefore, one or more PURIntervals are added until the UE enters to the IDLE mode. In FIG. 7, the reception time of the PUR configuration is SFN=0 and subframe number=0, fixed time offset is 4 subframes, and the UE enters to the IDLE mode at SFN=0 and subframe number=9. Therefore, one PURInterval (8 subframes configured in the third embodiment) is further added. Therefore, the starting point of the PUR resource is SFN=0 and subframe number=0 plus 4 subframes (fixed time offset) and plus 8 subframes (one PURInterval), i.e. "$SFN_{start}=1$, $subframe_{start}=2$".

In the third embodiment, the starting subframe number of the $N^{th}$ PUR occasion may also be represented by: $(10*SFN+subframe)=[(10*SFN_{start}+subframe_{start})+N*PURInterval]$ modulo 10240.

As shown in FIG. 7, the $1^{st}$ PUR occasion occurs at $[(10*1+2)+1*8]=20$ (i.e. simple subframe number=20, or SFN=2 and subframe number=0).

The third embodiment may be used in both explicit RRC signaling of state transition and implicit state transition. That is, either in explicit RRC signaling of state transition or in implicit state transition, the reception time of the PUR configuration is used to determine the starting time of the PUR resource. In addition, the eNB may reserve the PUR resource(s) for each potential UE state transition time.

Figure 8:
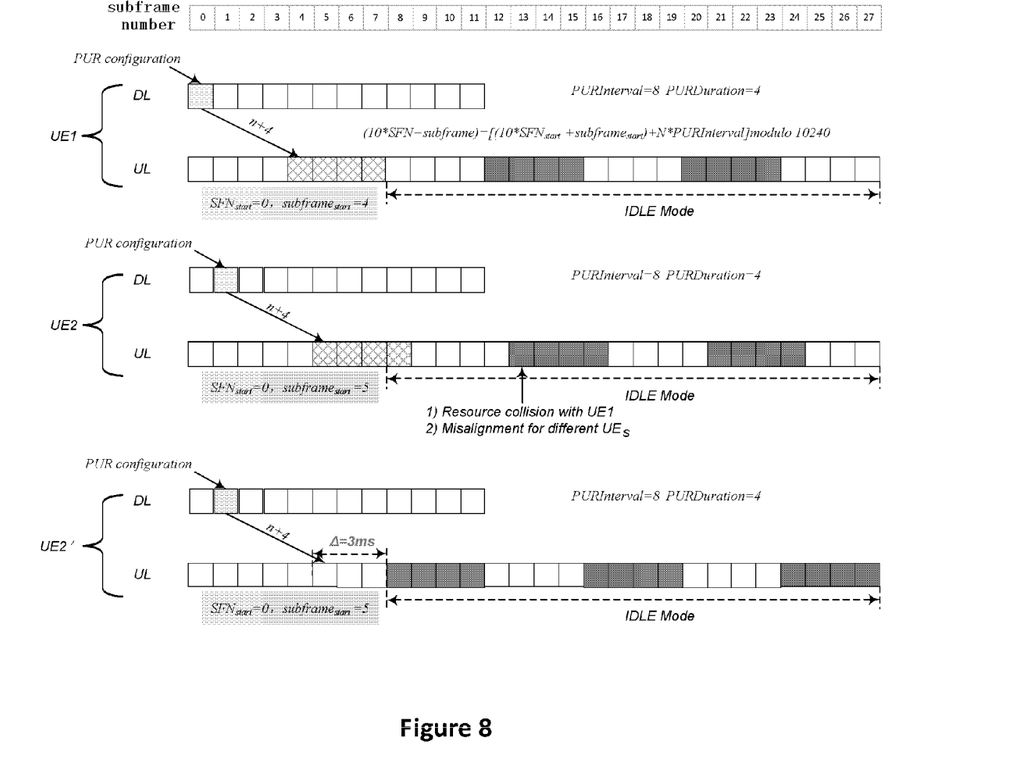
FIG. 8 illustrates a fourth embodiment for PUR resource configuration.

In the first and the third embodiments, the starting time of the PUR resource is determined by RRCConnectionRelease or RRCrelease reception time or PUR configuration reception time. The transmission of RRCConnectionRelease or RRCrelease and PUR configuration is constraint. As shown in FIG. 8, suppose the reception time of the PUR configuration for UE1 is SFN=0 and subframe number=0, which leads to the starting time of the PUR resource for UE1 being "$SFN_{start}=1$, subframe=2" (suppose that the fixed time offset is 4 subframes, and the UE1 transits to IDLE mode at SFN=0 and subframe number=8). Also shown in FIG. 8, the reception time of the PUR configuration for UE2 is SFN=0 and subframe number=1, which leads to the starting time of the PUR resource for UE2 being "$SFN_{start}=1$, $subframe_{start}=3$" (suppose that the fixed time offset is 4 subframes, and the UE2 transits to IDLE mode at SFN=0 and subframe number=8).

It can be seen that the first PUR occasion for UE1 is valid on SFN=1, subframe number from 2 to 5, while the first PUR occasion for UE2 is valid on SFN=1, subframe number from 3 to 6. Therefore, starting from SFN=1, subframe number=3, the UE2 will have a resource collision with UE1. This is caused by the fact that there is misalignment on PUR resources for different UEs.

In a fourth embodiment, an additional time offset Δ is configured to make alignment on PUR resources for different UEs.

As shown in FIG. 8, the additional time offset Δ is configured for UE2'. Therefore, the starting time of the PUR resource for UE2' will be the reception time of the PUR configuration (SFN=0 and subframe number=1) plus a fixed time offset (4 subframes) and plus the additional time offset Δ (3 subframes), i.e. SFN=0 and subframe number=8. As the UE2' has transited to the IDLE mode on SFN=0 and subframe number=8, it is not necessary to further add any PURInterval.

It can be seen that the first PUR occasion for UE2' is valid from SFN=0, subframe number 8 to SFN=1, subframe number 1, that has no PUR resource collision with UE1, the first PUR occasion of which is valid on SFN=1, subframe number from 2 to 5.

Therefore, by means of the additional time offset, the PUR resources for different UEs can be aligned. The PUR resource alignment is applicable for both dedicated PUR and shared PUR.

The additional time offset Δ may be configured by the PUR configuration. The additional time offset Δ may be any number of subframes. Preferably, the additional time offset Δ may be 1, 2, 4, 8, . . . .

In all of the above embodiments, the fixed time offset may be configured. In the fourth embodiment, the additional time offset is additionally configured. In a variety of the fourth embodiment, the fixed time offset and the additional time offset may be considered together as a total time offset Δ'. The total time offset Δ' may be 4, 5, 6, . . . .

The total time offset Δ' may be configured in the PUR configuration.

According to a fifth embodiment, the starting time of the PUR resource may be determined according to an absolute SFN and subframe number after UE transfers to IDLE mode. In particular, the eNB configures to the UE a time offset Δ2 to a predetermined reference time, for example, a system initial time which is SFN=0 and subframe=0.

The starting time of the PUR resource is the predetermined reference time (e.g. system initial time which is SFN=0 and subframe=0) plus the time offset Δ2.

If, at the time of the predetermined reference time plus the time offset Δ2, the UE has not transited to IDLE mode, then one or more PURIntervals will be added until the UE transits to the IDLE mode.

Therefore, the starting time of the first PUR occasion is the time offset Δ2 to the predetermined reference time plus a number of PURIntervals that make sure that the UE transits to the IDLE mode. That is, $(10*SFN_{start}+subframe_{start})$=predetermined reference time+Δ2+M*PURInterval, where M is a non-negative number to make sure that the UE has transited to the IDLE mode. Please note that at the time of the predetermined reference time+Δ2, if the UE has transited to the IDLE mode, M may be equal to 0. For simplicity, the predetermined reference time is always set as SFN=0 and subframe number=0. Therefore, the above formula may be simplified as $(10*SFN_{start}+subframe_{start})$=Δ2+M*PURInterval.

Optionally, if the UE may not complete the date processing, the fixed time offset may also be added or additional PURInterval may also be added.

In the fifth embodiment, the starting subframe number of the $N^{th}$ PUR occasion may also be represented by: $(10*SFN+subframe)=[(10*SFN_{start}+subframe_{start})+N*PURInterval]$ modulo 10240.

A sixth embodiment aims to support long IDLE period.

The SFN ranges from 0 to 1023. Therefore, in the condition that SFN and subframe number are used for indicating the starting time of the PUR Resource, the maximum PUR period is 1024 frames, i.e. 1024*10 ms=10.24 s.

In order to support PUR period of minute level or hour level, a hyper frame is introduced. A hyper frame is 1024 frames. It is represented as H_SFN (Hyper_SFN, i.e. hyper system frame number). Therefore, the starting time of the PUR resource may be represented as $H\_SFN_{start}$, $SFN_{start}$, $subframe_{start}$.

The simple starting subframe number of the $N^{th}$ PUR occasion may be represented as (10240*H_SFN+10*SFN+subframe)=[(10240*$H\_SFN_{start}$+10*$SFN_{start}$+$subframe_{start}$)+N*PURInterval] modulo W, in which W=10240*1024 assuming H_SFN ranges from 0 to 1023. The PURInterval may be configured to any values, for example, [sf10, sf20, . . . , sf640, . . . , sf6400, . . . , sf64000, . . . , sf640000, . . . ]. Here, "sf" means subframe, which is equal to 1 ms in 3GPP LTE.

The sixth embodiment may be used in any of the first to the fifth embodiment for the starting time of the PUR resource.

According to the sixth embodiment, the maximum PUR period will be 1024 hyper frames, i.e. 1024*1024*10 ms=10485.76 s≈174.76 minutes.

According to all of the above-described first to sixth embodiments, the granularity is a subframe. That is, the "subframe" is used as a unit time (or time duration) for indicating the starting time, the interval (PURInterval), the duration (PURDuration) and any time offset.

According to a seventh embodiment, the granularity will be changed to frame (i.e. SFN) or even hyper frame (i.e H_SFN).

Figure 9:
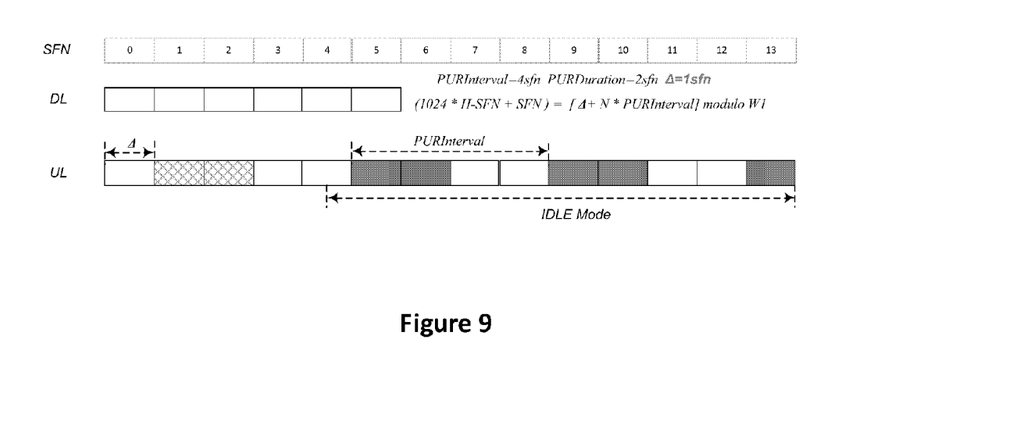
FIG. 9 illustrates a seventh embodiment for PUR resource configuration.

FIG. 9 illustrates the seventh embodiment in which the granularity is "frame". In FIG. 9, PURInterval is 4 frames, PURDuration is 2 frames, Δ is 1 frame. Δ may refer to a time offset considering the fixed time offset and/or the additional time offset.

The starting time of the PUR resource may be represented as "1024*$H\_SFN_{start}$+$SFN_{start}$". The starting SFN of the $N^{th}$ PUR occasion may be represented as (1024*H_SFN+SFN)=[(1024*$H\_SFN_{start}$+$SFN_{start}$)+N*PURInterval] modulo W0. W0 may be 1024*1024 assuming that the range of H_SFN is 0 to 1023 and the range of SFN is 0 to 1023. Here, the starting time of the PUR resource is the subframe #x and SFN number of (1024*$H\_SFN_{start}$+$SFN_{start}$), x may be configured to any one of 0-9 and preferably be configured to 0 as a default number.

Note that the UE transits to the IDLE mode at a particular subframe. The starting time of the first PUR occasion will be on or after the next frame to the frame including the particular subframe. The PURInterval may be configured to any values, for example, {rf2,rf4, . . . rf128 . . . }. The PURDuration may be configured to any values, for example, {rf1, rf2, . . . rf10}. The time offset Δ may be configured to any values, for example, {rf1, rf5, . . . }. Here, "rf" means radio frame, which is equal to 10 ms in 3GPP LTE.

Figure 10:
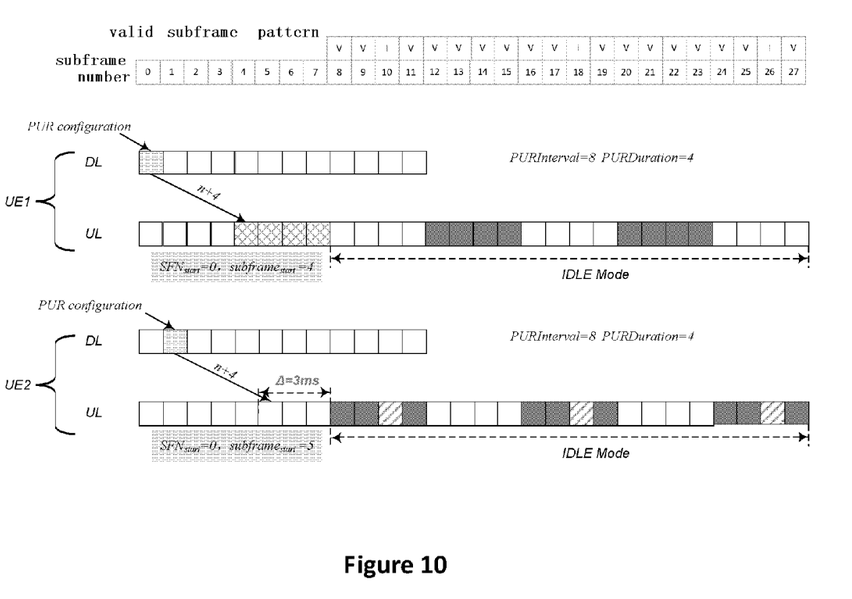
FIG. 10 illustrates a valid subframe pattern.

FIG. 10 illustrates a valid subframe pattern. As shown in FIG. 10, there are some subframes that are unavailable for the PUR resource, for example, simple subframe number 10, 18 and 26 shown in FIG. 10. In FIG. 10, "V" means that subframe is valid for uplink data transmission while "I" means that subframe is invalid for uplink data transmission.

Therefore, when these unavailable subframes fall within the configured PUR resources, it is preferable to explicitly exclude these subframes.

The PUR configuration may include a valid subframe pattern to indicate the available and the unavailable subframes. For example, a valid subframe pattern is a binary bitmap for indicating a subframe being valid or invalid for a particular length for example 1 frame. The valid subframe pattern may be periodic. For example, the period of the valid subframe pattern in FIG. 10 is 8 subframes.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:
    receiving a preconfigured uplink resource configuration that indicates a first time offset for data processing and a periodicity, the first time offset for data processing comprising a time offset between a reception time of a connection release signal and a first preconfigured uplink resource occasion and the periodicity being for preconfigured uplink resource occasions; and
    transmitting uplink data in a frequency-time resource starting from a starting time, wherein the starting time is determined based on a sum of:
        the reception time of the connection release signal expressed at least in part by a subframe number; and
        the first time offset for data processing.

2. The method of claim 1, wherein the frequency-time resource has a length of time duration for a preconfigured uplink resource duration, and the length of time duration for the preconfigured uplink resource duration is included in the preconfigured uplink resource configuration.

3. The method of claim 1, wherein a length of time durations for a preconfigured uplink resource interval is included in the preconfigured uplink resource configuration.

4. The method of claim 1, wherein the starting time is expressed as a frame number and an additional subframe number, as a hyper frame number, a system frame number and a subframe number, or as a hyper frame number and a system frame number.

5. The method of claim 4, wherein a length of a hyper frame is 10240 ms, a length of a frame is 10 ms, and a length of a subframe is 1 ms.

6. The method of claim 1, wherein the starting time is determined by a connection release signaling reception time plus at least the first time offset for data processing.

7. The method of claim 1, wherein:
    the preconfigured uplink resource configuration further comprises:
        a first length of time duration for a preconfigured uplink resource duration; and
        a second length of time duration for a preconfigured uplink resource interval, wherein the second length of time duration is different from the first length of time duration; and
    transmitting the uplink data in the frequency-time resource comprises transmitting the uplink data for the first length of time duration;
    the frequency-time resource comprises a first frequency-time resource; and
    the method further comprises transmitting a second frequency-time resource with an interval between transmission of the first frequency-time resource and the second frequency-time resource according to the second length of time duration.

8. A user equipment (UE), comprising:
at least one memory; and
at least one processor coupled with the at least one memory and configured to cause the UE to:
  receive a preconfigured uplink resource configuration that indicates a first time offset for data processing and a periodicity, the first time offset for data processing comprising a time offset between a reception time of a connection release signal and a first preconfigured uplink resource occasion and the periodicity being for preconfigured uplink resource occasions; and
  transmit uplink data in a frequency-time resource starting from a starting time, wherein the starting time is determined based on a sum of:
    the reception time of the connection release signal expressed at least in part by a subframe number; and
    the first time offset for data processing.

9. The UE of claim 8, wherein the frequency-time resource has a length of time duration for preconfigured uplink resource duration, and the length of time duration for preconfigured uplink resource duration is included in the preconfigured uplink resource configuration.

10. The UE of claim 8, wherein a length of time durations for a preconfigured uplink resource interval is included in the preconfigured uplink resource configuration.

11. The UE of claim 8, wherein the starting time is expressed as a frame number and an additional subframe number, as a hyper frame number, a system frame number and a subframe number, or as a hyper frame number and a system frame number.

12. The UE of claim 11, wherein a length of a hyper frame is 10240 ms, a length of a frame is 10 ms, and a length of a subframe is 1 ms.

13. The UE of claim 8, wherein:
the preconfigured uplink resource configuration further comprises:
  a first length of time duration for a preconfigured uplink resource duration; and
  a second length of time duration for a preconfigured uplink resource interval, wherein the second length of time duration is different from the first length of time duration; and
  causing the UE to transmit the uplink data in the frequency-time resource comprises causing the UE to transmit the uplink data for the first length of time duration;
the frequency-time resource comprises a first frequency-time resource; and
the at least one processor is further configured to cause the UE to transmit a second frequency-time resource with an interval between transmission of the first frequency-time resource and the second frequency-time resource according to the second length of time duration.

14. A base station, comprising:
at least one memory; and
at least one processor coupled with the at least one memory and configured to cause the base station to:
  transmit a preconfigured uplink resource configuration that indicates a first time offset for data processing and a periodicity, the first time offset for data processing comprising a time offset between a reception time of a connection release signal and a first preconfigured uplink resource occasion and the periodicity being for preconfigured uplink resource occasions; and
  receive uplink data in a frequency-time resource starting from a starting time, wherein the starting time is determined based on a sum of:
    the reception time of the connection release signal expressed at least in part by a subframe number; and
    the first time offset for data processing.

15. The base station of claim 14, wherein the frequency-time resource has a length of time duration for preconfigured uplink resource duration, and the length of time duration for preconfigured uplink resource duration is included in the preconfigured uplink resource configuration.

16. The base station of claim 14, wherein a length of time durations for a preconfigured uplink resource interval is included in the preconfigured uplink resource configuration.

17. The base station of claim 14, wherein the starting time is expressed as a frame number and a subframe number, as a hyper frame number, a system frame number and an additional subframe number, or as a hyper frame number and a system frame number.

18. The base station of claim 17, wherein a length of a hyper frame is 10240 ms, a length of a frame is 10 ms, and a length of a subframe is 1 ms.

19. The base station of claim 14, wherein the preconfigured uplink resource configuration further comprises:
  a first length of time duration for a preconfigured uplink resource duration; and
  a second length of time duration for a preconfigured uplink resource interval, wherein the second length of time duration is different from the first length of time duration.

20. A processor for wireless communication, comprising:
at least one controller coupled with at least one memory and configured to cause the processor to:
  receive a preconfigured uplink resource configuration comprising an indicator of a first time offset for data processing, the first time offset for data processing comprising a time offset between a reception time of a connection release signal and a starting time of an uplink data transmission; and
  transmit, in response to receiving the connection release signal, uplink data in a frequency-time resource starting from a starting time, wherein the starting time is determined based on a sum of:
    the reception time of the connection release signal expressed at least in part by a subframe number; and
    the first time offset for data processing.

* * * * *